US008490075B2

(12) United States Patent
Waris et al.

(10) Patent No.: US 8,490,075 B2
(45) Date of Patent: Jul. 16, 2013

(54) METHOD AND APPARATUS FOR OPTIMIZING AN EXCHANGE OF SERVICE UPDATES

(75) Inventors: Heikki Pekka Waris, Helsinki (FI); Jukka Kalevi Nurminen, Espoo (FI)

(73) Assignee: Nokia Corporation, Espoo (FI)

( * ) Notice: Subject to any disclaimer, the term of this patent is extended or adjusted under 35 U.S.C. 154(b) by 743 days.

(21) Appl. No.: 12/624,042

(22) Filed: Nov. 23, 2009

(65) Prior Publication Data

US 2011/0126185 A1 May 26, 2011

(51) Int. Cl.
*G06F 9/44* (2006.01)
*G06F 15/173* (2006.01)
*G06F 15/16* (2006.01)

(52) U.S. Cl.
USPC ............ 717/169; 709/203; 709/223; 709/225

(58) Field of Classification Search
None
See application file for complete search history.

(56) References Cited

U.S. PATENT DOCUMENTS

| | | | | |
|---|---|---|---|---|
| 6,205,478 B1* | 3/2001 | Sugano et al. | ............... | 709/223 |
| 7,127,485 B2* | 10/2006 | Caruso et al. | ................. | 709/203 |
| 7,483,693 B2* | 1/2009 | Lueng et al. | ............... | 455/414.1 |
| 7,539,632 B1* | 5/2009 | Chakrabarti et al. | ........ | 705/26.1 |
| 2005/0207416 A1* | 9/2005 | Rajkotia | ....................... | 370/390 |
| 2006/0015588 A1* | 1/2006 | Achlioptas et al. | ............ | 709/220 |
| 2007/0027987 A1* | 2/2007 | Tripp et al. | .................... | 709/225 |
| 2007/0270133 A1* | 11/2007 | Hampel et al. | ............. | 455/414.2 |
| 2009/0312033 A1* | 12/2009 | Shen et al. | ................. | 455/456.1 |
| 2010/0064006 A1* | 3/2010 | Chaintreau et al. | ........... | 709/204 |
| 2010/0082693 A1* | 4/2010 | Hugg et al. | .................. | 707/798 |
| 2010/0087184 A1 | 4/2010 | Stoev et al. | | |
| 2010/0169789 A1* | 7/2010 | Cheng et al. | .................. | 709/225 |
| 2011/0050732 A1* | 3/2011 | Arrasvuori | .................... | 709/204 |

OTHER PUBLICATIONS

Ashraf Khalil et al., Context-aware telephony: Privacy Preferences and Sharing Patterns, ACM 2006, [Retrieved on Feb. 15, 2013]. Retrieved from the internet: <URL: http://dl.acm.org/citation.cfm?id=1180947> 10 Pages (469-478).*
Understanding Direct Push. Microsoft TechNet, Microsoft Corporation, Published: 2010, Last Modified: Nov. 30, 2009, Accessed: Mar. 16, 2010, http://technet.microsoft.com/en-us/library/aa997252(printer).aspx.

* cited by examiner

*Primary Examiner* — Don Wong
*Assistant Examiner* — Anibal Rivera
(74) *Attorney, Agent, or Firm* — Ditthavong Mori & Steiner P.C.

(57) ABSTRACT

An approach is provided for optimizing an exchange of service updates. A service update manager determines factors related to a level of activity, context, status, or combination thereof between a first device and a second device with respect to an information sharing service. The service update manager then computes a pair update rate for sharing information between the first device and second device via the information sharing service based on the determined factors, and transmits the pair update rate to the first device and the second device. If the first device and second device are members of a group created in the information sharing service, the service update manager computes respective pair update rates for each pair of members within the group, and computes a group update rate based on the respective pair updates. If one or more members of the group are members of one or more other groups, the service update manager computes respective group update rates for the group and each of the one or more other groups, and computes an aggregate group update rate based on the respective group update rates.

15 Claims, 9 Drawing Sheets

METHOD AND APPARATUS FOR OPTIMIZING AN EXCHANGE OF SERVICE UPDATES

BACKGROUND

Service providers and device manufacturers are continually challenged to deliver value and convenience to consumers by, for example, providing compelling network services and advancing the underlying technologies. As a result, service providers and device manufacturers now offer a growing array of services such as social networking, mobile messaging, location tracking, navigation, online gaming, and the like that have become popular among users. Many of these services traditionally rely on frequent updates or status checks over a communication network. These frequent updates or status checks, however, can consume significant resources and stress the power management systems of participating devices, particularly in mobile environments where energy sources (e.g., batteries) are limited in capacity.

SOME EXAMPLE EMBODIMENTS

Therefore, there is a need for an approach for optimizing the exchange of service updates between device peers and/or groups to minimize power and resource consumption.

According to one embodiment, a method comprises determining factors related to a level of activity, context, status, or combination thereof between a first device and a second device with respect to an information sharing service. The method also comprises computing a pair update rate for sharing information between the first device and second device via the information sharing service based on the determined factors. The method further comprises causing, at least in part, actions that result in transmission of the pair update rate to the first device and the second device. If the first device and second device are members of a group created in the information sharing service, the method further comprises computing respective pair update rates for each pair of members within the group, and computing a group update rate based on the respective pair updates. If one or more members of the group are members of one or more other groups, the method further comprises computing respective group update rates for the group and each of the one or more other groups, and computing an aggregate group update rate based on the respective group update rates.

According to another embodiment, an apparatus comprising at least one processor, and at least one memory including computer program code, the at least one memory and the computer program code configured to, with the at least one processor, cause, at least in part, the apparatus to determine factors related to a level of activity, context, status, or combination thereof between a first device and a second device with respect to an information sharing service. The apparatus is further caused to compute a pair update rate for sharing information between the first device and second device via the information sharing service based on the determined factors. The apparatus further causes actions that result in transmission of the pair update rate to the first device and the second device. If the first device and second device are members of a group created in the information sharing service, the apparatus is further caused to compute respective pair update rates for each pair of members within the group, and compute a group update rate based on the respective pair updates. If one or more members of the group are members of one or more other groups, the apparatus is further caused to compute respective group update rates for the group and each of the one or more other groups, and compute an aggregate group update rate based on the respective group update rates.

According to another embodiment, a computer-readable storage medium carrying one or more sequences of one or more instructions which, when executed by one or more processors, cause, at least in part, an apparatus to determine factors related to a level of activity, context, status, or combination thereof between a first device and a second device with respect to an information sharing service. The apparatus is further caused to compute a pair update rate for sharing information between the first device and second device via the information sharing service based on the determined factors. The apparatus further causes actions that result in transmission of the pair update rate to the first device and the second device. If the first device and second device are members of a group created in the information sharing service, the apparatus is further caused to compute respective pair update rates for each pair of members within the group, and compute a group update rate based on the respective pair updates. If one or more members of the group are members of one or more other groups, the apparatus is further caused to compute respective group update rates for the group and each of the one or more other groups, and compute an aggregate group update rate based on the respective group update rates.

According to another embodiment, an apparatus comprises means for determining factors related to a level of activity, context, status, or combination thereof between a first device and a second device with respect to an information sharing service. The apparatus also comprises means for computing a pair update rate for sharing information between the first device and second device via the information sharing service based on the determined factors. The apparatus further comprises means for causing, at least in part, actions that result in transmission of the pair update rate to the first device and the second device. If the first device and second device are members of a group created in the information sharing service, the apparatus further comprises means for computing respective pair update rates for each pair of members within the group, and means for computing a group update rate based on the respective pair updates. If one or more members of the group are members of one or more other groups, the apparatus further comprises means for computing respective group update rates for the group and each of the one or more other groups, and means for computing an aggregate group update rate based on the respective group update rates.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for optimizing an exchange of service updates are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
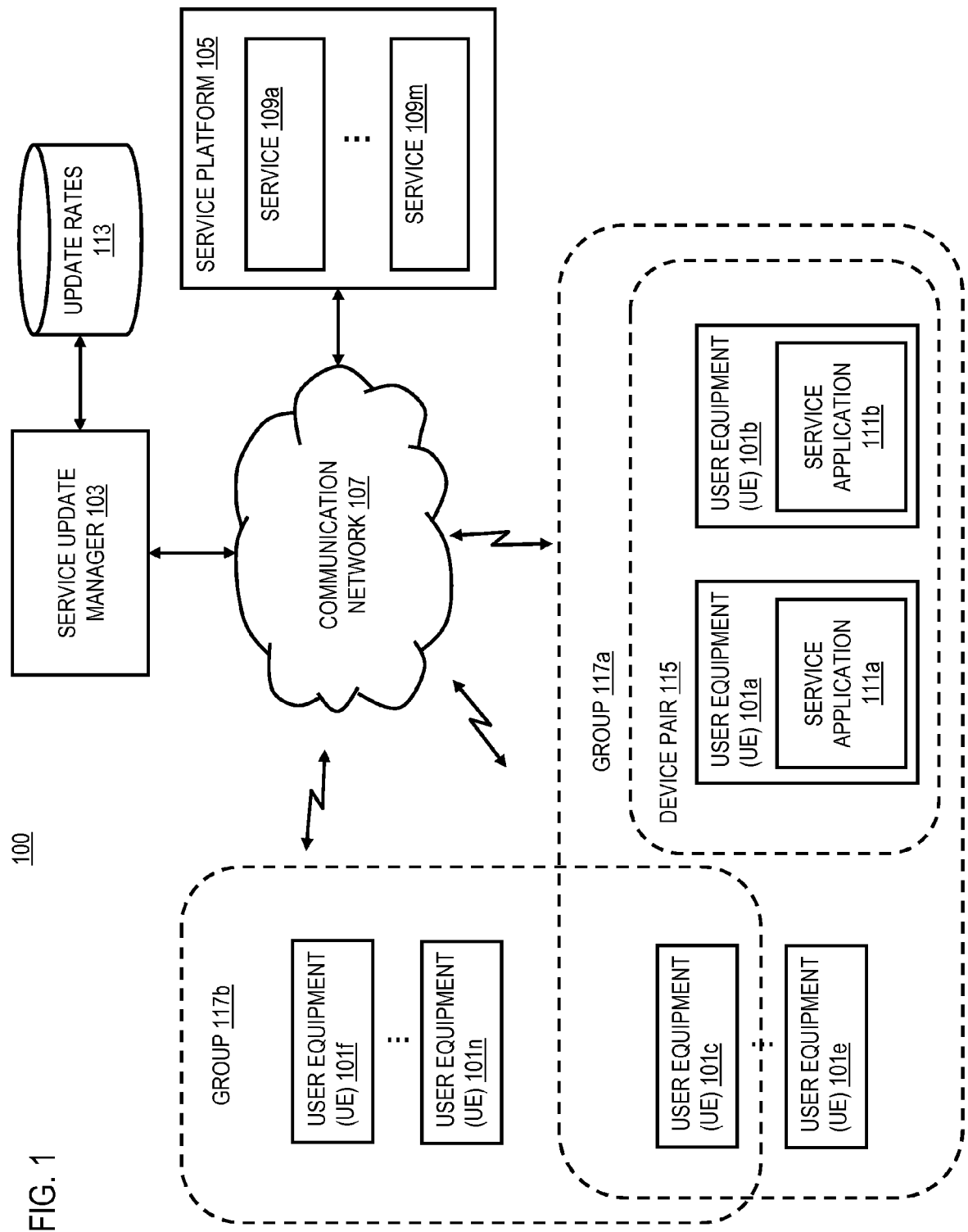
FIG. 1 is a diagram of a system capable of optimizing the exchange of service updates, according to one embodiment.

FIG. 1 is a diagram of a system capable of optimizing an exchange of service updates, according to one embodiment. As noted above, increasing numbers of users are relying on services (e.g., social networking, mobile messaging, location-based services, etc.) that traditionally employ frequent updates between or among devices (e.g., peer to peer devices, client to server devices, etc.). Although progress has been made in reducing the size of updates in terms of the amount of data, the network interfaces used to facilitate these updates, especially cellular or mobile network interfaces, nonetheless consume a potentially large amount of resources (e.g., computing resources, power resources, etc.) for establishing and tearing down communication connections for the updates. Also, the processor of the device may need to be woken up and afterwards put back into hibernation if the updates take place while the user is not actively interacting with the device. Therefore, the traditional updating processes can quickly deplete the energy reserves of devices, particularly devices with limited energy sources (e.g., mobile handsets, portable computing devices, etc.).

More specifically, a device may execute or otherwise access applications or clients of services that employ updates to connect groups of users. The clients may perform updates with, for instance, servers corresponding to each respective service. By way of example, these updates may provide status information on the client and the device or other clients and their associated devices. When the various services that reside in the device are all active simultaneously, the clients of the services may cause the device to establish network connections at arbitrary times depending on the default update rate or schedule of the different services. With each of these connections, there is a corresponding resource overhead (e.g., power requirements, processing requirements, bandwidth requirements). Moreover, with any one of the connections, the client initiating the connection is unlikely to fully utilize the available bandwidth due to the often small amounts of data involved in updates. In other cases, the exchanged update information may not actually provide any added value if no other device is subscribed to the updates, or if the other devices are otherwise not paying attention to the updates. Accordingly, the device's available resources, particularly power or energy resources, can be wasted, thereby reducing the overall efficiency and amount of time that the service can be used.

To address the problems described above, the system 100 of FIG. 1 introduces the capability to optimize the service update rates of multiple services to coordinate the use of available resources. More specifically, the system 100 may reduce the number or frequency of updates to refresh a user's information shared with other users of a particular service when, for instance: (1) the other users have not activated or logged into the service, or have put the client into a background state; (2) the user's information is not displayed to the other users because the application treats it with low priority compared to other information; (3) the other users are determined to be not socially close to the first user; and/or (4) the other users are determined to be not significant to the first user based on their locations with respect to the first user.

In addition, using the same or similar criteria as listed above, the system 100 may optimize the update rates of sensor readings (e.g., location sensor readings, temperature readings, etc.) that may be part of the corresponding service. For example, in a location tracking service, the system 100 may reduce or stop taking location readings from a global positioning system (GPS) receiver of the device if no other active user is subscribed to receive the location information.

When multiple services are active, the system 100 introduces the capability to more specifically synchronize updates between the services based on the update needs of the group of users as a whole. Also, if the update frequency of one service is changed, then the content of the update the update can also be adapted to reflect the changed rate. In one embodiment, the system 100 supports multiple users via peer-to-peer exchange of updated timing information, as well as the client-server based exchange of updated timing information. It is contemplated that the information that causes a client to change its update rate or frequency can be something other than a proposed update interval, such as a type indicator that conveys demand characteristics of the other users and applications. In this way, the system 100 enables the optimization of service update rates based on predefined rules or criteria other than timing information.

In one embodiment, the system 100 optimizes and determines service update rates in a bottom-up hierarchical fashion. For example, if there are multiple groups of devices operating over multiple services, the system 100 begins by determining an update rate for individual pairs within each group. These pairwise update rates are determined based on, for instance, a predetermined application/service specific rate that is updated based on visibility, social significance, and/or location significance with respect to each peer in the pair. Next, the system 100 moves up the hierarchy by determining a group specific update rate. The group specific rate is, for instance, a function (e.g., average, minimum, maximum, etc.) of the pairwise update rates for each pair of devices in the group. In addition, the calculated group specific update rate may be further individualized for each device in the group by applying a factor or multiple of the determined group specific update rate (e.g., q×group update rate, wherein q is a rational number). The factor or multiple is calculated or defined individually for each device.

At the top of the hierarchy, the system 100 can determine an aggregate group rate when devices belong to multiple groups at the same time. This aggregate group rate is a function of the group specific update rates of each group. The function is, for instance, a weighted average of the group specific update rates with the weighting based on how large or tightly connected (e.g., socially connected) each group is. Furthermore, an operational group update rate can be calculated for each group by applying a factor or multiple to the determined aggregate group update rate. As used herein, the term "operational group update rate" is used to refer to the update rate applied the devices in the group in actual practice. By way of example, the factor or multiple is a rational number based on how connected a group is.

As shown in FIG. 1, the system 100 comprises user equipment (UEs) 101a-101n having connectivity to a service update manager 103 and a service platform 105 via a communication network 107. In one embodiment, the service update manager 103 facilitates the optimization of service update rates for the services 109a-109m of the service platform 105. The service update manager 103 also facilitates the subsequent access and/or manipulation of the functions of the service update manager 103 and/or the services 109a-109m by service applications 111a-111n (service applications 111c-111n not show) executed by the respective UEs 101a-101n. In one embodiment, as discussed previously, the services 109a-109b include a suite of services that provide updates (e.g., frequent and/or periodic updates) of status or other information among a plurality of UEs 101. By way of example, the services 109a-109m may include social networking, mobile messaging, location tracking, navigation, online gaming, activity tracking, reporting of context information, and the like.

In one embodiment, the service update manager 103 determines factors that may influence how the service update manager 103 optimizes the application service update rates. These factors include, for instance, a level of activity, context (e.g., social relationships, location, time, etc.), status, or a combination thereof between UEs 101a-101n participating in one or more information sharing services 109a-109m. As described above, the service update manager 103 computes service updates hierarchically for pairs, groups, and multiple groups of devices. By way of example, the service update manager 103 may store the optimized update rates and other related information in the database 113 of update rates. In addition or alternatively, the update rates database 113 can reside on one or more nodes connected directly or indirectly to one or more of the services 109a-109m. In other embodiments, the update rates database 113 resides on one or more nodes in network 107. More specifically, the update rates database 113 includes one or more processes (not shown) and one or more data structures that stores information about the service update rates of the services 109a-109m including related data, configurations, user profiles, variables, conditions, and the like associated with optimizing the update rates for any of the services 109a-109m.

As shown, the UEs 101a and 101b may be organized as a device pair 115 with respect to a particular service 109a. More specifically, as a device pair 115, the two UEs 101a and 101b maintain an information sharing relationship in the service 109a corresponding to the pair relationship. This relationship enables the device pair 115 to, for instance, exchange status information, status updates, service information, and/ or other related information. In one embodiment, the device pair 115 may be further organized into a group 117a or 117b. Groups 117a-117b include UEs 101a that have established information sharing relationships among several UEs 101a-101n. Any one UE 101a within the group 117a may be paired with any other UEs 101a-101n within the group 117a. In addition, the UE 101a may have any number of pairing relationships, and the relationships may be different between each pair. It is also contemplated that the UE 101a may belong to more than one group 117a. Each group 117a-117b may be associated with either the same information sharing service 109a or different services 109a-109m. The services 109a-109m may have different predetermined or calculated service update rates.

In certain embodiments, the service update manager 103 may operate a web server (not shown) to facilitate access to and/or manipulation of the service update rates using a web browser (not shown) executed on one or more of the UEs 101a-101n. In this way, the UEs 101a-101n need not execute a service application 111 to access the functions of the service update manager 103.

Figure 7:
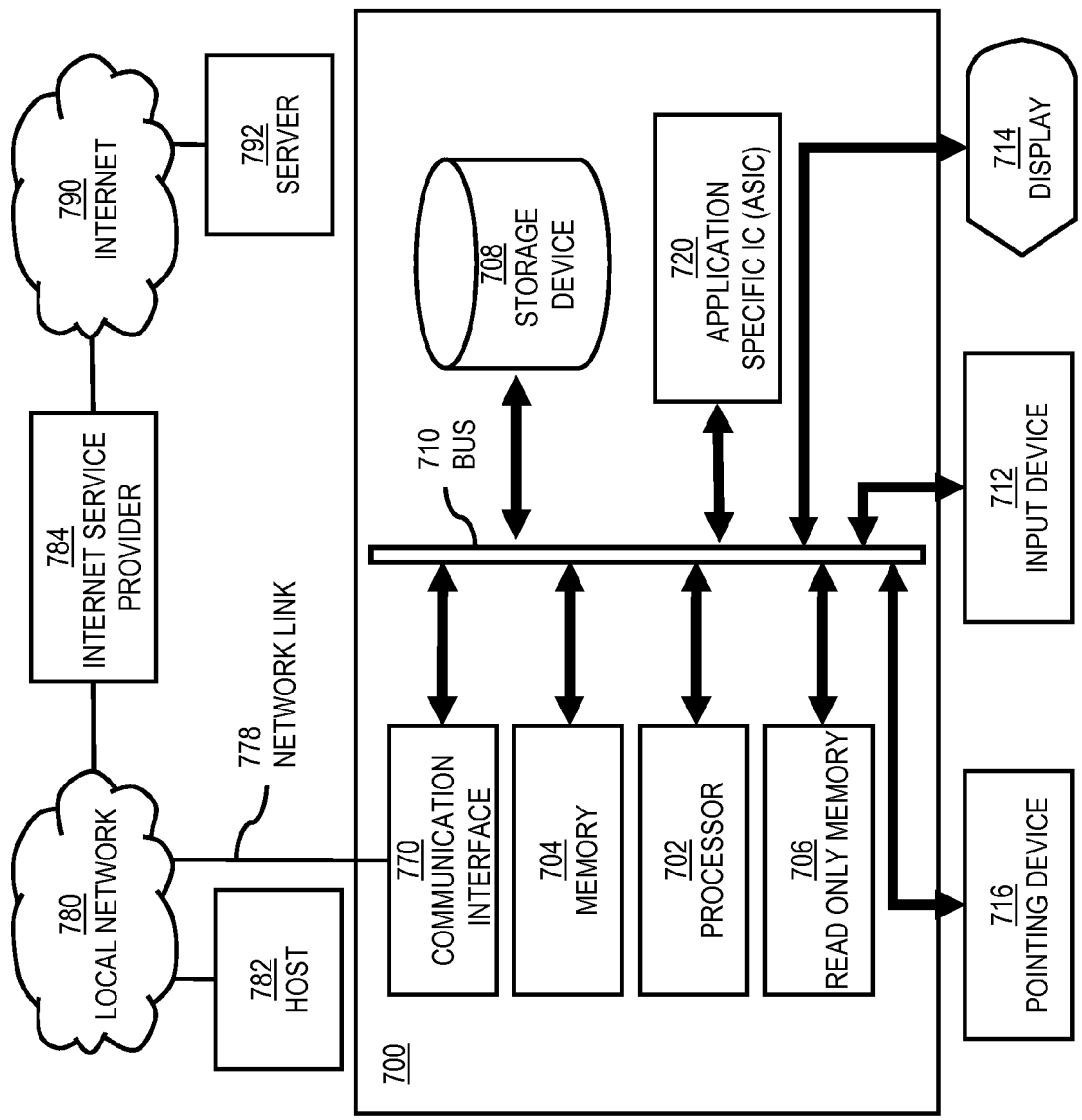
FIG. 7 is a diagram of hardware that can be used to implement an embodiment of the invention.

In another embodiment, the service update manager 103 and the service platform 105 can be implemented via shared, partially shared, or different computer hardware (e.g., the hardware described with respect to FIG. 7). For example, the service platform 105 (e.g., Nokia Ovi services) mashes up services which users have subscribed to and filters their content into a device specific (e.g., mobile device specific) optimized format (e.g., a widget application). In this case, the service update manager 103 via the service platform 105 directly knows when users log in and out of a service 109. The service update manager 103 would additionally receive within the updates from the service application 111 of the UE 101a regarding relevant changes in the activity of the UE 101a, such as moving the service application 111 into a background process, not displaying any updates related to another UE 101b, or closing the service application 111 altogether.

The service update manager 103 would also have access to statistics on the user's data in order to determine social weights between a pair of UEs 101a-101b, as well as location information of both UEs 101a-101b to determine location weights between a pair of UEs 101a-101b. The service update manager 103 would then be able to calculate the recommended number of updates per unit time (e.g., the update rate or frequency), and communicate this to the UEs 101a-101b along with the rate of the most frequently updating service 109 (e.g., a common update rate). The service applications 111a-111b of the UEs 101a-101b can then confirm that the applications 111a-111b are adopting the new rate, or adjust the rate based on specific additional requirements and constraints of the UEs 101a-101b. In one embodiment, if there is no congestion caused by all the updates (e.g., sent in synchronized bursts per the approach described herein), then all services could adopt the highest rate that is calculated for any service 109 of the service platform 105, because there would anyway be some network activity taking place at that rate.

In yet another embodiment, the functions of the service update manager 103 may be performed by, for instance, the service application 111 at the UE 101a. In this case, the service platform 105 and/or the service update manager 103 can provide the statistics or social information that the UE 101a itself has no access to. This information includes items such as whether a peer is logged in, has the application in background, or is not displaying the user's updates. In addition, the service platform 105 and/or service update manager 103 may provide information on the number of common services and peers of the UEs 101a-101b and location weighting factors to provide a measure of social connectedness between the UEs 101a-101b.

In addition or alternatively, the UEs 101a-101b can receive the social information directly from other peer UEs 101a-

101*n*. In this case, the service application 111 of each UE 101 or other similar component may aggregate the information related to the various peer UEs 101*a*-101*n* and their services 109*a*-109*m* for calculating the corresponding update rates.

By way of example, the communication network 107 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UEs 101 are any type of mobile terminal, fixed terminal, or portable terminal including a mobile handset, station, unit, device, multimedia tablet, multimedia computer, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may also be equipped with one or more sensors (e.g., a global positioning satellite (GPS) sensor, accelerometer, light sensor, etc.) for use with the services 109*a*-109*m*.

By way of example, the UEs 101, the service update manager 103, and the service platform 105 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the service application 111 and the service update manager 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In one embodiment, the server is integrated as part of the client.

In another embodiment, the service application 111 and the service update manager 103 interact using widely known peer-to-peer protocols, wherein nodes (e.g., UEs 101*a*-101*n*) communicate and transfer information among each other directly without a mediating server process.

Figure 2:
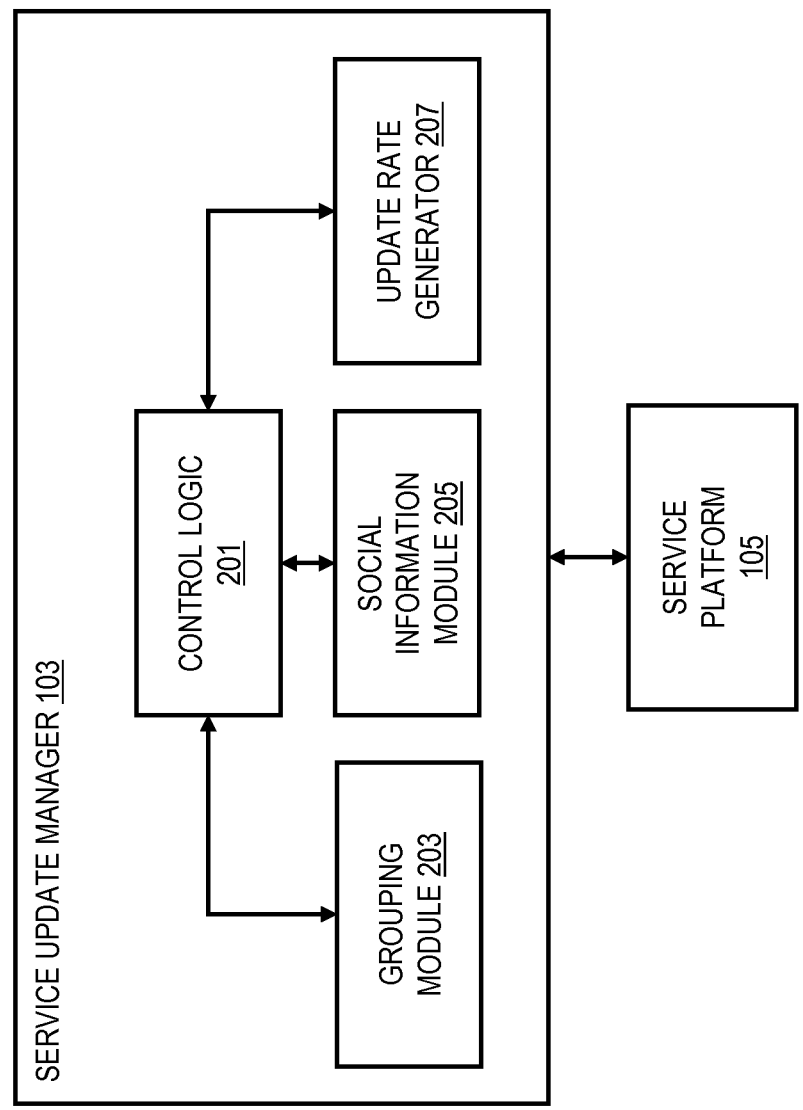
FIG. 2 is a diagram of a service update manager, according to one embodiment.

FIG. 2 is a diagram of components of a service update manager, according to one embodiment. By way of example, the service update manager 103 includes one or more components for optimizing an exchange of service updates among the UEs 101 and the services 109*a*-109*m*. It is contemplated that the functions of these components may be combined in one or more components or performed by other components of equivalent functionality. In this embodiment, the service update manager 103 includes at least a control logic 201 which executes at least one algorithm for executing functions of the service update manager 103. For example, the control logic 201 interacts with the grouping module 203 to determine the relationships and groupings among a group of UEs 101 within respect to the services 109*a*-109*m* of the service platform 105. For example, the grouping module 203 retrieves this relationship and grouping information from the corresponding service 109*a* in the service platform 105 to identify specific device pairs 115 and groups 117*a*-117*b*. In a location tracking service, for instance, the relationship may establish that a first UE 101*a* shares its location with another UE 101*b* or a group 117*a* of UEs 101*a*-101*n*.

Based on the determined grouping information, the control logic 201 next interacts with the social information module 205 to determine contextual information describing the strengths of the relationships among the UEs 101. The social information module 205 may also determine other types of social information including a level of activity of each of the UEs 101*a*-101*n* within the corresponding service 109. The level of activity may indicate, for instance, how often the UE 101a is updating the information that it is sharing or how often the UE 101a is requesting information over the service 109. Other information retrieved by the social information module 205 includes the existence or strength of a social relationship between two or more UEs 101a-101b. The social relationship information may be extrapolated from: (1) the number of relationships created among the UEs 101a-101n; (2) the amount of information shared among the UEs 101a-101n; (3) the amount of time viewing information shared among the UEs 101; and/or other similar factors. The social information module 205 may also retrieve information a location of the UEs 101a-101n, visibility of the UEs 101a-101n with respect to the information sharing service 109, a predetermined or default update rate specified for the service 109, or a combination thereof.

Using the information retrieved by the social information module 205, the update rate generator 207 computes update rates for each of the determined grouping of UEs 101. At a device pair 115 level, the computed pair update rate is based on retrieved social information specific to each of the UEs 101a-101n in the pair 115. In certain embodiments, the social information module 205 may append metadata to the pair update to describe, for instance, the factors used to calculate the rate, the origin of the update rate (e.g., what UEs 101 or other network component generated the update rate), a processing of the pair update rate (e.g., what priority or order should be given to the update rate), or a combination thereof. The update rate generator 207 can also determine the pair update rates for each respective device pair 115 in a particular social group 117 and then generate a group specific update rate based on the pair update rates for each specific device pair 115. In one embodiment, the group specific update rate is determined by averaging the respective pair updates, determining a weighted average based on a degree of social significance between each pair of members, determining a minimum of the respective pair updates, or a combination thereof. When there are multiple groups 117, the update rate generator 207 may compute an aggregate group update rate that optimizes an update rate for the multiple groups. This aggregate group update rate is based, at least in part, on averaging the respective group update rates, determining a weighted average based on a degree of closeness of social relationships within the group and each of the one or more other groups, determining a minimum of the respective group update rates, or a combination thereof. In another embodiment, the update rate generator may also compute update rates for each individual UE 101a based on the computed group update rate or the computed aggregate group update rate. This individual update rate enables the service update manager 103 to advantageously customize individual rates based on the information sharing needs of the specific service 109 and UE 101a while still optimizing and synchronizing the update intervals with the respective device pairs 115, groups 117, and/or aggregate groups. It is contemplated that any of the computed update rates (e.g., the pair update rate, group update rate, aggregate update rate, individual update rates, etc.) may include or be appended with the metadata as described with respect to the pair update rate above.

Figure 3:
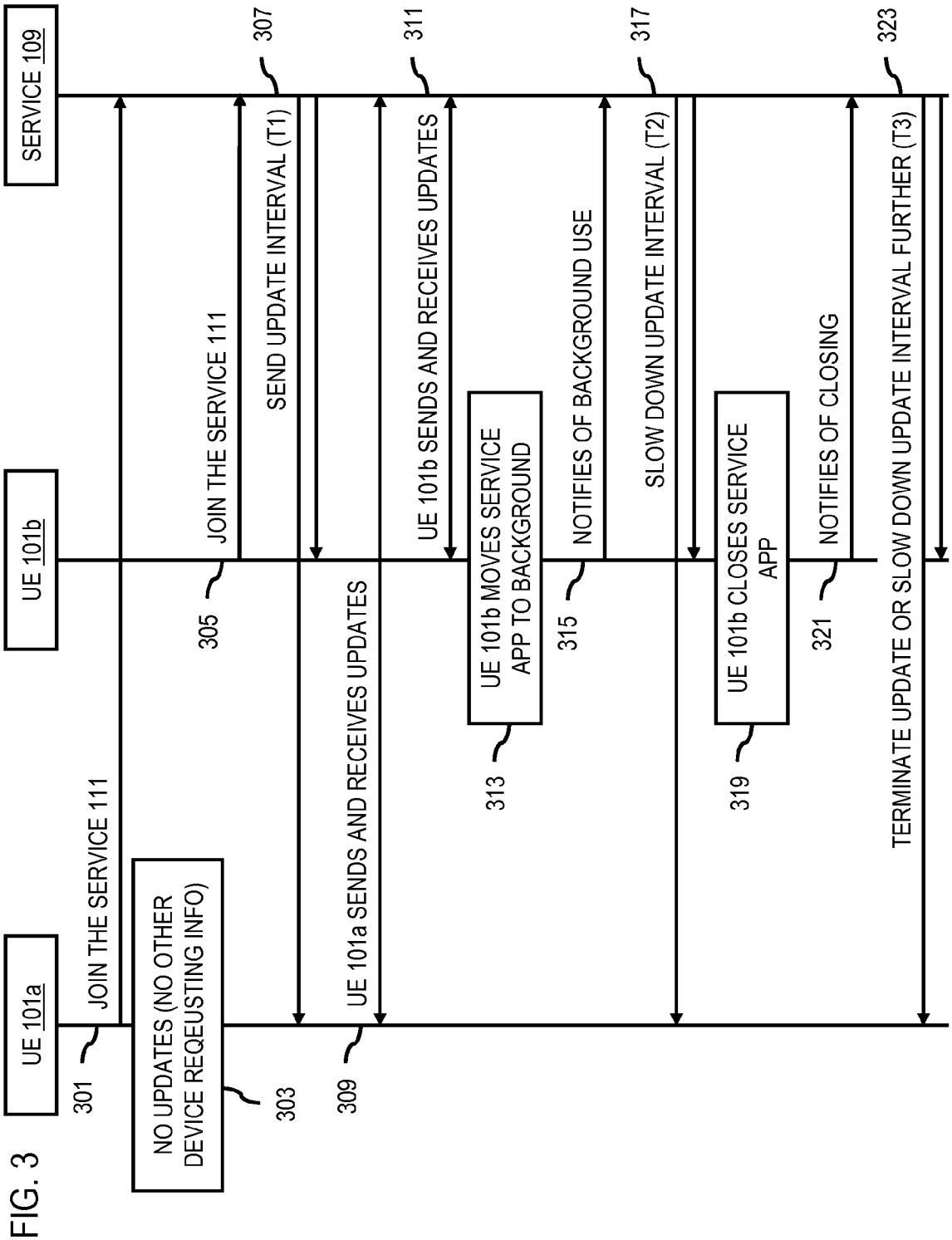
FIG. 3 is a time sequence diagram that illustrates a sequence of messages and processes for optimizing the exchange of service updates, according to one embodiment.

FIG. 3 is a time sequence diagram that illustrates a sequence of messages and processes for optimizing the exchange of service updates, according to one embodiment. A network process on the network is represented by a shaded vertical box. A message passed from one process to another is represented by horizontal arrows. A step performed by a process is indicated by the text. The processes represented in FIG. 3 are a UE 101a, a UE 101b, and a service 109. In this example, the service 109 includes or operates in tandem with the service update manager 103 to optimize update rates for the service 109 using the approach described herein.

At 301, the UE 101a joins the service 109 for sharing information with other devices (e.g., the UE 101b). By way of example, joining the service includes, for instance, subscribing to or creating an account with the service 109. In certain embodiments, the UE 101a designates the information to share and the frequency with which it is shared. At this point, no other device has requested the information that the UE 101a is sharing over the service 109. Accordingly, the service update manager 103 determines that there is no need to expend resources transmitting updates from the UE 101a, and therefore no updates are scheduled from the UE 101a (at 303). At 305, another UE 101b joins the service 111 and requests the information shared by the UE 101a. In response, the service update manager 103 sends a message 307 setting an update interval T1 to both the UEs 101a and 101b. In one embodiment, the update interval is specified as a time interval or frequency at which the UEs 101a and 101b transmit and/or receive information or information updates. In addition or alternatively, the update interval T1 may be specified as a distance from or to a point location or as any other measure of an interval. For example, in a location tracking service, the update interval T1 may specify that the UEs 101a and 101b transmit and/or receive updates after traveling every 100 meters. In addition or alternatively, the update interval T1 may be specified as a number of messages buffered at the UEs 101a-101b or service 109. For example, in a discussion forum service, the update interval T1 may specify that the UEs 101a and 101b transmit updates after every new comment and receive updates after every 5 new comments. Moreover, it is contemplated that the update interval T1 may be specified according to any terms or measures to indicate a frequency that is contextually appropriate to the service 109.

After receiving the message 307 with the update interval T1, the UE 101a begins sending and/or receiving updates according to the specified interval T1 (at 309). At the same time, the UE 101b also begins sending and/or receiving updates at the sample interval T1 (at 311). At 313, the UE 101b moves the service application 111 associated with the service 109 to a background process of the UE 101b. In other words, the UE 101b moves the service application 111 into a state of lower priority or lower visibility in the UE 101b. On moving the application 111 to a background process, the UE 101b sends a notification 315 to the service 109 or the service update manager 103 of the service 109 that the application 111 is now in the background. On receiving the notice, the service update manager 103 infers that service information updates are also a lower priority for the UE 101b. Accordingly, the service update manager 103 computes a new update interval T2 to slow down or otherwise reduce the interval to reflect the lower priority. The update interval T2 is then transmitted in a message 317 to the UEs 101a and 101b, which then begin transmitting and/or receiving updates according to the update interval T2.

At 319, the UE 101b closes the service application 111, thereby stopping the transmission and/or receiving of updates from the UE 101a and the service 109. On closing the service application 111, the UE 101b notifies the service 109 and/or the service update manager 103 that the service application 111 has been closed (at 321). In response, the service update manager 103 infers that the UE 101b is no longer able and/or interested in receiving updates from the UE 101a or the service 109. Accordingly, the service update manager 103 terminates subsequent transmission and/or receiving of updates from the UE 101a because no device is currently requesting the information shared by the UE 101*a*. In addition or alternatively, the service update manager 103 may compute a new update interval T3 that slows or otherwise reduces the interval even further. The command to terminate or to adopt the update interval T3 is then transmitted to the UEs 101*a* and 101*b* (at 323).

Figure 4:
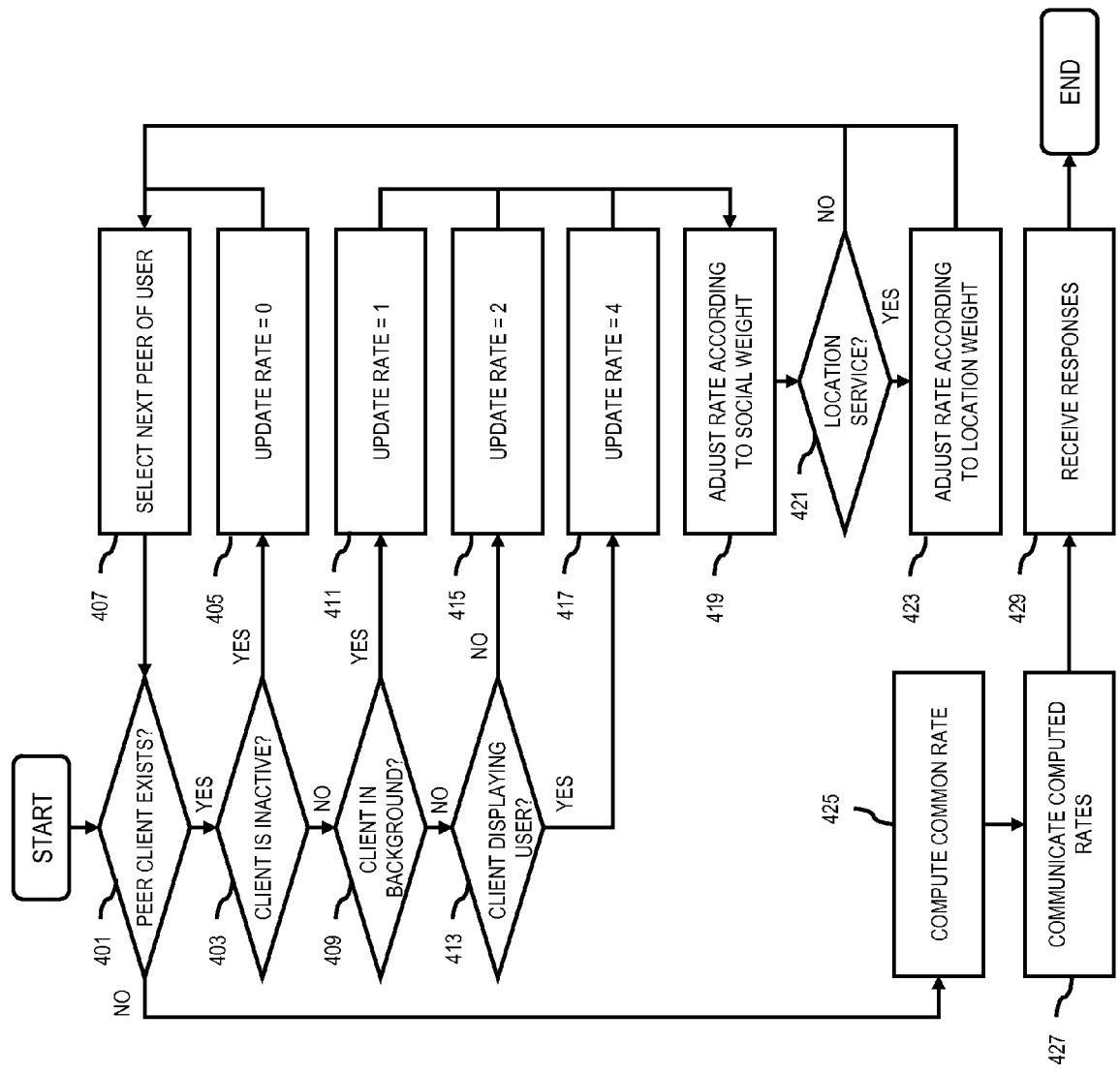
FIG. 4 is a flowchart of a process for determining an update rate for a service, according to one embodiment.
Figure 8:
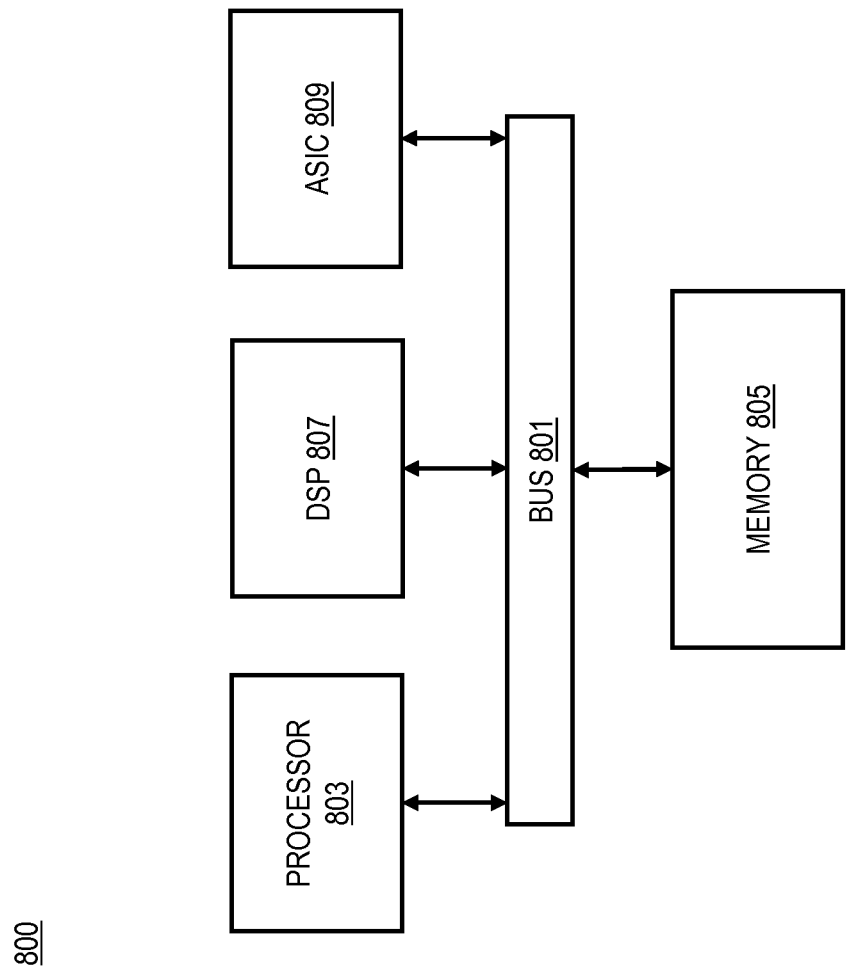
FIG. 8 is a diagram of a chip set that can be used to implement an embodiment of the invention.

FIG. 4 is a flowchart of a process for determining an update rate for a service, according to one embodiment. In one embodiment, the service update manager 103 performs the process 400 and is implemented in, for instance, a chip set including a processor and a memory as shown in FIG. 8. In step 401, the service update manager selects the first peer UE 101*a* from a list of known peer UEs ordered according to existence of a client application 111 and determines whether the UE 101*a* includes a client application 111 of the service 109. The client or service application 111, for instance, provides connectivity to the functions of the corresponding service 109 for sharing information among a group of UEs 101*a*-101*n*.

If the client application 111 exists, the service update manager 103 determines whether the application 111 is inactive (step 403). If the client application 111 is inactive, the service update manager sets an initial update rate to 0. In this example, the update rate is left dimensionless, but it is contemplated that any dimension such as time (e.g., seconds, minutes, hours, etc.), distance (e.g., yards, miles, etc.), or other measure of interval may be used. By way of example, an update rate of zero indicates that the update would produce little or no added value. In this case, because the client application 111 is inactive, the updates can be buffered and then delivered if the updates are still valid when the update rate is increased and an update should be sent. After setting the update rate to zero, the service update selects the next peer UE 101*a* to evaluate (step 407) and returns to the process at step 401.

If the client application 111 is not inactive, the service update manager 103 determines whether the client application 111 is running as a background process (e.g., indicating that the client application is not shown on the UI, or is of a lower priority) (step 409). If the application 111 is running as a background process, the service update manager 103 sets the update rate to 1 (step 411). In this case, the background status of the application 111 indicates that the user is interested in receiving updates but that the updates are not the user's highest priority at the moment. Accordingly, the update can proceed with a relatively low frequency of 1.

If the client application 111 is not in a background process, the service update manager 103 determines the application is active and then determines whether the client application 111 is displaying the status or information of the user (step 413). Displaying the status of the user, for instance, indicates a high degree of interest in information being shared by the user. However, if the application 111 is active and not displaying the status or information of the user, there is still the potential for a heightened level of interest in the user's information. As a result, service update manager 103 sets an update rate at 2 (step 415). If the application 111 is both active and displaying the user's status or information, the service update manager 103 sets the update rate to 4, its highest default rate (step 417).

In certain embodiments, the service update manager 103 can adjust the determined default update rate based on, for instance, how closely the UEs 101*a*-101*n* are socially connected (step 419). In one embodiment, social connectedness or the closeness of social relationships between the UEs 101*a*-101*n* is determined based on shared profiles, designation by the UEs 101*a*-101*n*, shared contacts, and the like. The weighting factors can be used to either increase or decrease the determined update rate as illustrated in Table 1 below. Table 1 is an example of the factors that may be used to adjust the determined update rate. The list is not exhaustive and it is contemplated that other factors may be used to determine rate adjustments. In one embodiment, the factors adjust a multiplier of the default update rate, resulting in the update rate based on, for instance, the following formula:

$$\text{Update rate} = \text{Default rate} * (1 + \Sigma_{n=1\ldots11}(\text{social\_factor}_n))$$

TABLE 1

| | Social Weight Adjustments to Update Rate |
|---|---|
| +0.3 | If UE 101b is among UE 101a's contacts shortlist or favorites |
| −0.2 | If UE 101b is not aligned with UE 101a's current profile (e.g., UE 101b is a work contact, when UE 101a is set to a home profile) |
| −0.1 | If UE 101b is not among UE 101a's contact list |
| +0.2 | If the number of common contacts between UE 101a and UE 101b > UE 101a's top quartile |
| −0.2 | If the number of common contacts between UE 101a and UE 101b < UE 101a's bottom quartile |
| +0.2 | If the number of status inquiries by UE 101a on UE 101b > UE 101a's top quartile |
| −0.2 | If the number of status inquiries by UE 101a on UE 101b < UE 101a's bottom quartile |
| +0.1 | If the number of services shared by UE 101a and UE 101b > UE 101a's top quartile |
| −0.1 | If the number of services shared by UE 101a and UE 101b < UE 101a's bottom quartile |
| +0.1 | If the number of peers shared by UE 101a and UE 101b > UE 101a's top quartile |
| −0.1 | If the number of peers shared by UE 101a and UE 101b < UE 101a's bottom quartile |

Next, the service update manager 103 determines whether the corresponding service 109 is based, at least in part, on location services (step 421). Such services include, for instance, location tracking services, navigation services, and the like. If the service 109 includes location features, the service update manager 103 can further adjust the update according to location weighting factors (step 423). Examples of adjustments based on location are listed in the Table 2 below. In one embodiment, the factors adjust a multiplier of the previously determined update rate, resulting in the update rate based on, for instance, the following formula:

$$\text{Update rate} = \text{Update rate} * (1 + \Sigma_{n=1\ldots9}(\text{location\_factor}_n))$$

TABLE 2

| | Location Weight Adjustments to Update Rate |
|---|---|
| +0.3 | If UE 101b has the same transit modality as UE 101a (e.g., pedestrian, car, etc.) |
| −0.2 | If UE 101b is not aligned with UE 101a's current active location service (e.g., UE 101b is using a location tracking service while UE 101a is using a navigation service) |
| −0.1 | If UE 101a or UE 101b is stationary for the past 10 update intervals |
| +0.2 | If UE 101b is within the areas where UE 101a spends >90% of the time |
| −0.2 | If UE 101b is outside the areas where UE 101a spends >90% of the time |
| +0.2 | If the number of co-locations between UE 101a and UE 101b > UE 101a's top quartile |
| −0.2 | If the number of co-locations between UE 101a and UE 101b < UE 101a's bottom quartile |
| +0.1 | If the number of peers tracked by UE 101a and UE 101b > UE 101a's top quartile |

TABLE 2-continued

Location Weight Adjustments to Update Rate

| | |
|---|---|
| −0.1 | If the number of peers tracked by UE 101a and UE 101b < UE 101a's bottom quartile |

It is further contemplated that the service update manager 103 may use other categories of factors to adjust the update rate. In one embodiment, the service update manager 103 may apply certain weight factors that reflect how dynamic the overall service is. For example, following another user's exercise route in a sports activity tracking service would have a higher default update rate than following the progress of a strategy game (e.g., chess) where users are expected to ponder a move for a significant amount of time before taking an action. In another embodiment, the user may also specify weights to different services according to how important they are to the user. In addition or alternatively, the importance factor may be determined automatically, e.g., by measuring the portion of the user's time that is spent on each service 109.

After determining and adjusting the rate for all remaining peer UEs 101a-101n and services 109a-109m, the service update manager 103 can determine a common rate to apply based on the respective update rates for each respective pair of UEs 101a-101b (step 425). In one embodiment, the service weights discussed above can also be used in a further alternative where the common rate is determined as a weighted average of the different rates of the different services 109a-109m. For example, the weighted average results in a compromise where the Quality of Service (QoS) of some services 109 may be degraded in order to achieve a common update rate.

In yet another embodiment, the rates may also be adjusted based on a commonly used granularity such as an Internet Protocol (IP) heartbeat rate common to the UEs 101a-101n. For example, the IP heartbeat rate may specify transmission of a control signal once per minute or some other frequency to coincide with the determined service update rates. In this case, the service update rates can be rounded to match the nearest heartbeat rate. The determined rates are then communicated to the UEs 101a-101n (step 427)

Also, in order to balance the load in the service 209 or the network 107, the service update rates (or time points) communicated to different UEs 101a-101n may be shifted so as to avoid simultaneous arrivals of update bursts from all UEs 101a-101n at the same time while having relatively little activity between the update intervals. For example, the update rate may be shifted based on a multiple or factor calculated for each UE 101a-101n based on the weighting factors specific to each UE 101a-101n.

In one embodiment, when the UE 101a selects a certain update rate, the UE 101a can choose to apply the rate to each of the services 109a-109m. If the rate is higher than what is requested by those services 109a-109m (e.g., the service 109a updates less frequently than the determined rate), the lower rate can be used for them. If the rate is lower than what is requested by those services 109a-109m, the changed rate may cause an adaptation of the update contents. For example, the client application 111 can then add metadata to the updates that indicate, e.g., an increase in the uncertainty thresholds it associates with the updates, or indicate to peer UEs 101a-101n that the update rate has been lowered. If selected, the service update manager 103 can perform these actions on behalf of the client application 111. The service update manager 103 then receives responses and updates from the UEs 101a-101n according to the determined update rate.

Figure 5:
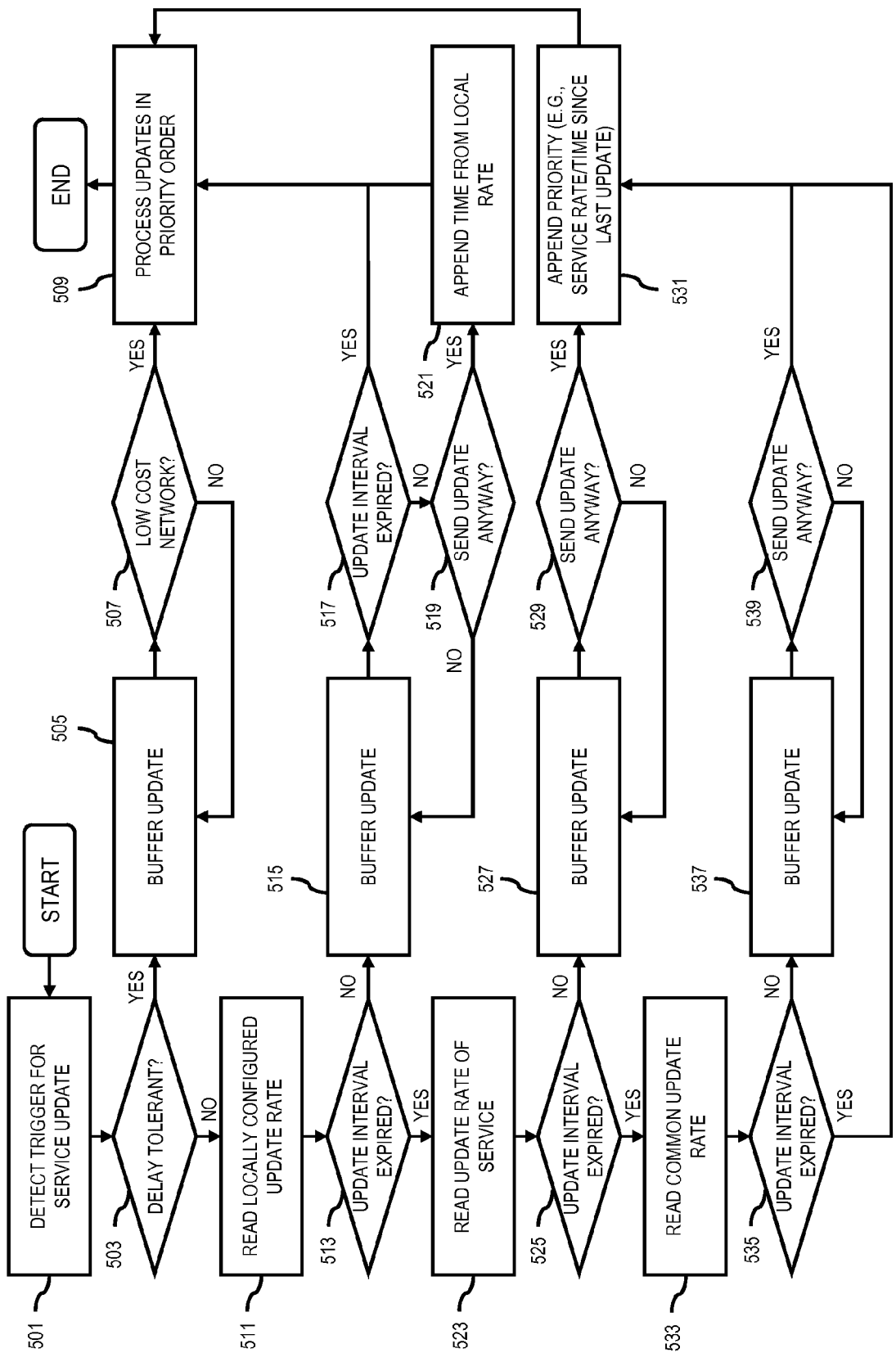
FIG. 5 is a flowchart of a process for scheduling updates for multiple services, according to one embodiment.

FIG. 5 is a flowchart of a process for scheduling updates for multiple services, according to one embodiment. In one embodiment, the service application 111 performs the process 500 and is implemented in, for instance, a chip set including a processor and a memory as shown in FIG. 8. The process 500 assumes that the service update manager 103 has determined the appropriate service update rates and has transmitted the rates to the service application 111 for scheduling of updates. In step 501, service application 111 detects a trigger for transmitting a service update to the service 109 and/or other UEs 101a-101n. The service application 111 can generate the update based on a local trigger (e.g., local event or timer) or a remote trigger (e.g., request from the service 109 or the service update manager 103).

In one embodiment, the client application 111 can append metadata to the update to allow it to be scheduled among other updates such that a requested QoS is achieved at minimum level of energy consumption. The client application 111 then determines whether the update is delay tolerant or not time critical (e.g., having a deadline for transmission set to 30 minutes in the future) (step 503). If the update is delay tolerant, the update can be stored or buffered until there is sufficient free capacity in one of the update bursts sent by the UE 101a (step 505). Prior to that, the UE 101a sends more time critical updates. The criticality can be also based on other factors than time, such as location.

Furthermore, in case there is congestion within the bursts of updates, the scheduling between updates of different services 109a-109m could be derived from the service specific update rate calculated as described previously. The service 109a with the highest rate would receive the highest priority of getting its update within a limited burst. It should be noted that optimal burst sizes also vary along with differences in the capacity of the underlying networks (e.g., network 107) and the amount of other communications that might share that capacity, such as phone calls.

If there are reasonable grounds to expect that the device will at some point be in an area (such as home or office) with a low cost transmission network (e.g., a power-save mode enabled WLAN or a high-capacity smart memory tag), then it would be beneficial to delay transmissions until that time (step 507). In this case, the metadata appended by the client application 111 could indicate that the scheduling is not at all time critical (i.e. delay tolerant), meaning that, e.g., the upload of recently taken photos and videos to the sharing service could wait until evening when the user is at home and can access over the home WLAN where the updates are processed and transmitted in order of priority (step 509).

If the update is not delay tolerant, the service application 111 reads the locally configured update as determined by, for instance, the service update manager 103 (step 511). By way of example, if the selected updates have known dependencies to an energy consuming local action (such as taking GPS readings), then if the update rate is higher than what is configured as the currently preferred rate of local actions, the local action rate is selected instead of the general rate. This locally influenced rate is then communicated to the service update manager 103, which can take it into account in its recommendations for the update rates of other users dependent on such updates.

If the client application 111 nevertheless sends more frequent updates, the service update manager 103 can take the dependency into account and increase the uncertainty displayed to other users according to the now known real rate of updated information. This can be also done with metadata that is appended to the update, where the metadata indicates the actual time when the update information was generated, as distinguished from the time when the update was delivered (sent or received). With the metadata, the service update manager 103 can also indicate to the client application 111 when the service update manager 103 would need a GPS reading or a Cell ID reading, so that the service update manager 103 could normally combine the two to determine the client's location and supply that to other users, but at some points the application 111 would need to verify the more exact location such as with a GPS reading. This would allow the UE 101 to minimize energy consuming GPS readings.

After determining the local update rate, the service application 111 determines whether the update interval specified in the local update rate has expired (step 513). By way of example, expiration of the location update rate interval triggers processing and transmission of an update. If the update interval has not expired, the update is buffered (step 515) and held in the buffer until the interval expires (517). At which point the update is processed for transmission in order or priority (step 509). In some cases (e.g., when other network activity apart from scheduled transmissions is occurring that enables transmission of the update), the service application 111 can send the update anyway (step 519) and appends the time difference between the sending time and the scheduled transmission time calculated from the local rate to reset the interval expiration timer (step 521).

In addition or alternatively, on expiration of the local update time interval, the service application 111 can read the update rate of the corresponding service (step 523). The service update rate may specify, for instance, a frequency or update interval to support or facilitate achievement of a specified QoS. The service application 111 then determines whether the service specific update interval has expired (step 525). If not, the update is buffered until the service update interval expires (step 527). The service application 111 can also send the update anyway based on other concurrent network activity (step 529). To send the update, the service application 111 appends a priority to the metadata of the update and forwards the update for processing (step 531). In one embodiment, the priority for the update can be calculated as the service specific update rate divided by the time elapsed since the last update.

If the service specific update rate has expired, the service application 111 reads the common update rate computed by the service update manager 103 (step 533). As described above with respect to the other rates, service application 111 then determines whether the common update rate has expired (step 535). If not, the update is buffered until the common update rate expires (step 537). The service application 111 can also send the update anyway without expiration of the common rate interval based on other concurrent network activity (step 539). To send the update, the service application 111 appends a priority to the metadata of the update and forwards the update for processing (step 531). Using this process the service application 111 can step through the hierarchy of update rates from the local update rate to the service update rate and finally to the common update rate.

In one embodiment, when the service application 111 receives from the service update manager 103 the recommended update rate and the common rate, the service application 111 can adjust its operation accordingly. For example, if the recommended rate is higher than the common rate, the service application 111 has some freedom in choosing an optimal rate based on the rates of its peers and other service clients (within the rate granularity or other constraints enforced by the server or device).

The service application 111 can exchange the new rate with its peer UEs 101a-101n by appending it in its updates with them. In some embodiments, the application 111 can also select only a few key peer UEs 101a-101n based on user input or application's own logic. If the peer UEs 101a-101n have different rates, then they can tentatively agree on the average rate of all peers, or the maximum rate of any peer.

The service application 111 can also exchange the new rate with other client applications in the same UE 101a. If the other client applications 111 have different rates, then they can tentatively agree on the average rate of all applications 111, or the maximum rate of any client application 111, or adopt the common rate communicated by the service update manager 103.

The service application 111 can then determine its preferred rate based on the tentatively agreed rates collected from other clients in peer UEs 101a-101b, and from clients of other applications in the same UE 101a. The preferred rate can be the average rate of all clients, or the maximum rate of any client.

If the rate thus determined is less than the client application 111's default rate, the application 111 can adjust its update content such as increase the uncertainty area in its location updates or change the user status in a chatting service as "occasionally active".

This alignment between the peer client applications 111 and the client application 111 inside one peer UE 101a can be implemented as a process in the service update manager 103 where the service update manager 103 contains agents acting on behalf of the client applications 111, or the service update manager 103 can act as only the mediator of the negotiations.

If the common update rate is calculated as a simple average (which is a crude method not taking into account, e.g., the degree of connectedness between the different groups or the calculation of group rates as rational number multiples of each other's rates), the determination of the overall rate(s) can be summarized in the pseudocode in Table 3.

TABLE 3

```
FOR all devices i in the group
    FOR all clients j of device i
        FOR all peer clients k of client j
                        IF rate_min of peer client k > rate_max of
            client j
                        THEN move device of client k to the next
            group
                        ELSE rate_j[k] = (client j rate + client k rate) /
            2
        rate_i[j] = (sum of rate_j[k]) / k
    rate_i = (sum of rate_i[j]) / j
rate_for_group = (sum of rate_i) / i
IF clients have been moved to a next group
THEN go to the beginning and perform the same steps for devices in that
group
END when there are no more next groups
```

Rate_max is the lowest of: the common rate for clients of the device indicated by the server; or the highest rate for update bursts enforced by a local policy (this can depend on the type of access network or the remaining battery level).
Rate_min is the highest of: the minimum rate required to keep alive the service or its related network connections (this can depend on the access network); or the locally configured minimum update rate of the device.
Rate of client x is the rate calculated and recommended by the server for the client.

Figure 6:
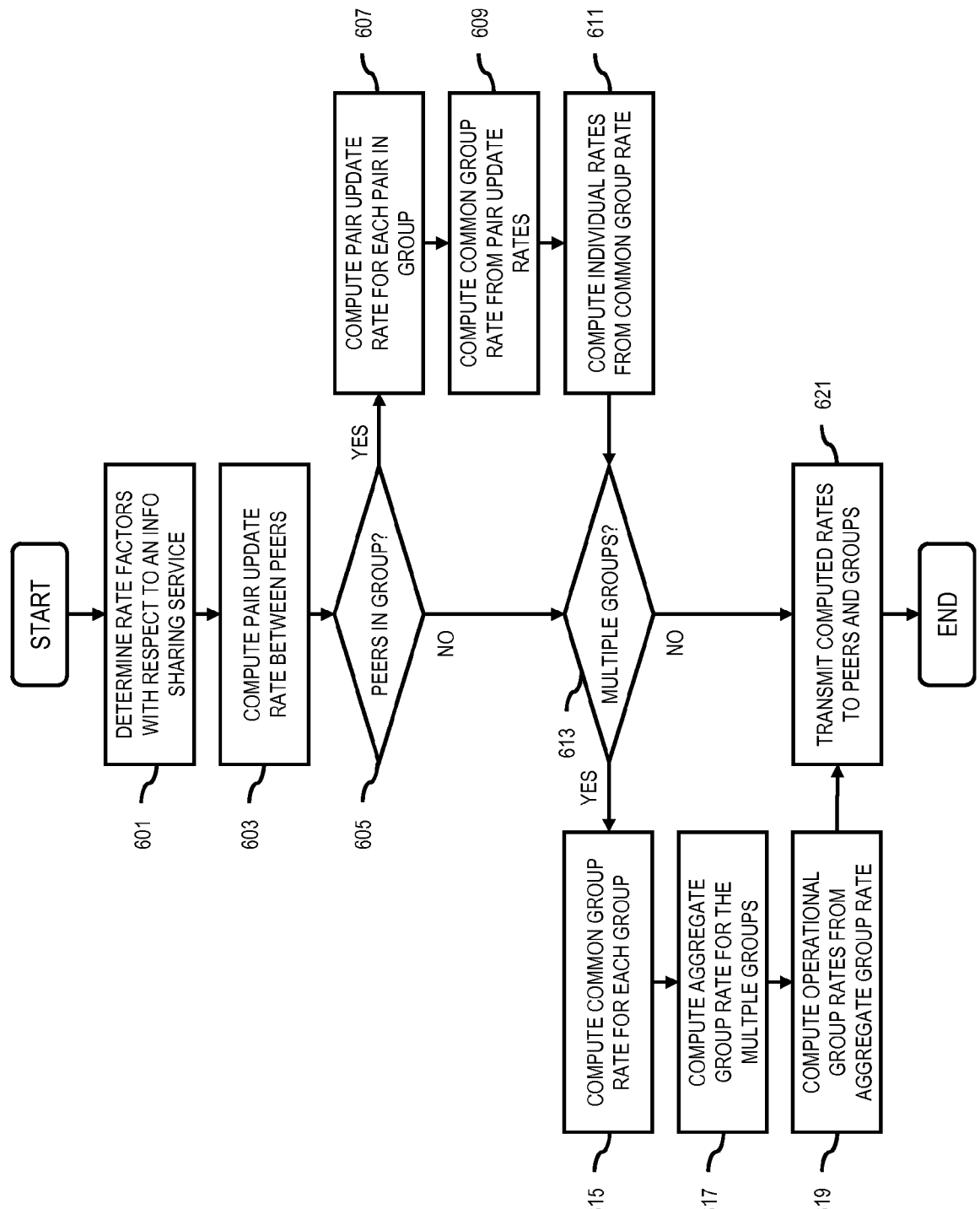
FIG. 6 is a flowchart of a process for hierarchically determining update rates for pairs of devices, groups of devices, and multiple groups of devices, according to one embodiment.

FIG. 6 is a flowchart of a process for hierarchically determining update rates for pairs of devices, groups of devices, and multiple groups of devices, according to one embodiment. In one embodiment, the service update manager 103 performs the process 600 and is implemented in, for instance, a chip set including a processor and a memory as shown in FIG. 8. As described previously, the service update manager 103 determines update rates using a bottom up hierarchical approach. In the process 600, the service update manager 103 initiates the determination of a pair update rate between two peer UEs 101*a*-101*b* that are sharing information over a service 109. The UEs 101*a*-101*b* may be a standalone pair or may be part of a larger group of UEs 101*a*-101*n*. In step 601, the service update manager 103 determines rate factors related to a level of activity, context, status, or combination thereof between the UEs 101*a*-101*b* with respect to an information sharing service 109. These factors include an existence of a social relationship created in the information sharing service 109, a location, a visibility of the UEs 101*a*-110*b* in the service 109, a predetermined service update rate, or a combination thereof. In one embodiment, these factors are determined from the information retrieved from the service platform 105, from sensors (e.g., GPS receiver) of the UEs 101*a*-101*n*, and/or other information sources available over the communication network 107. This information is then used compute a pair update rate according to the process 400 of FIG. 4 (step 603).

Next, the service update manager determines whether the peer UEs 101*a*-101*b* are part of a larger social group of other UEs 101*a*-101*n* created in the information sharing service 109 (step 605). If the UEs 101*a*-101*b* are members of such a group, the service update manager 103 computes respective pair update rates for each pair of UEs 101*a*-101*n* within the group (step 607). In one embodiment, the pair update rates are only computed for UE 101 pairs that have established an information sharing relationship within the group. The service update manager 103 then uses the computed pair update rates to compute a common group rate for the UEs 101*a*-101*b* (step 609). In one embodiment, the group update rate is computed by averaging the respective pair update rates, determining a weighted average based on a degree of social significance between each pair of members, determining a minimum of the respective pair update rates, or a combination thereof.

In certain embodiments, the service update manager 103 can then calculate individual or local update rates for each of the UEs 101*a*-101*n* based on the a respective weighting factors or multiples applied to the computed group update rate (step 611). More specifically, the individual update rates apply social and weighting factors as described in the process 400 of FIG. 4 to adjust the group update rate to account for requirements or constraints of each UE 101*a*-101*n*. In addition, the multiples are rational numbers that are applied to group update to, for instance, stagger at least some of the update intervals used by the UEs 101*a*-101*n*. This staggering helps to balance resource loads on the network 107 and avoid creating spikes in bandwidth demand that may occur when transmissions are synchronized.

After determining the group update rate, the service update manager 103 determines whether one or more of the UEs 101*a*-101*b* are members of multiple groups (step 613). If so, the service update manager 103 computes a common group rate for each of the multiple groups (step 615) and then computes an aggregate group rate for the multiple groups (step 617). The aggregate group rate enables the service update manager 111 to optimize the exchange of service updates across the multiple groups. The aggregate group rate is computed by averaging the respective group update rates, determining a weighted average based on a degree of closeness of social relationships within the group and each of the one or more other groups, determining a minimum of the respective group update rates, or a combination thereof.

As with the individual rates, the service update manager 103 can also recursively calculate an operational group rate for each group based on the aggregate group rate (step 619). In one embodiment, the operational group update rate is based, at least in part, on applying a determined multiple to the aggregate group rate. The multiple is determined based on a respective degree of closeness of social relationships among the groups used to generate the aggregate group rate. The closeness of social relationships can be determined using the factors listed in Tables 1 and 2 above. The service update manager 103 then transmits the computed rates to the UEs 101*a*-101*n* comprising the peer devices and groups (step 621).

The processes described herein for providing optimizing an exchange of service updates may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to optimize an exchange of service updates as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of optimizing an exchange of service updates.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to optimize an exchange of service updates. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for optimizing an exchange of service updates. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for optimizing an exchange of service updates, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for optimizing an exchange of service updates.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to optimize an exchange of service updates as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of optimizing an exchange of service updates.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to optimize an exchange of service updates. The memory 805 also stores the data associated with or generated by the execution of the inventive steps.

Figure 9:
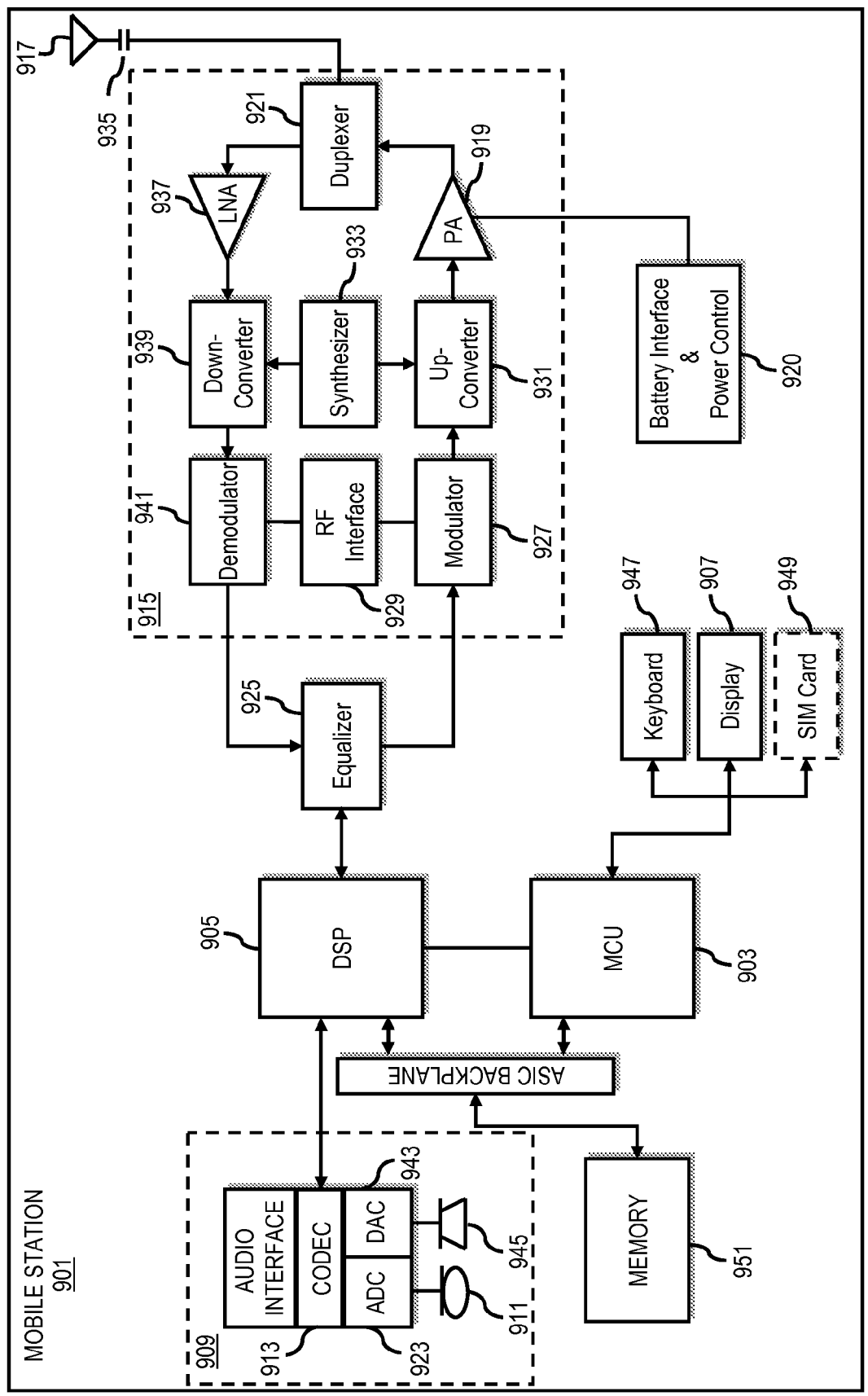
FIG. 9 is a diagram of a mobile terminal (e.g., a handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of optimizing an exchange of service updates. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of optimizing an exchange of service updates. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to optimize an exchange of service updates. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of comprising:
    determining factors related to a level of activity, context, status, or combination thereof between a first device and a second device with respect to an information sharing service;
    computing a pair update rate for sharing information between the first device and second device via the information sharing service based on the determined factors; and
    causing, at least in part, actions that result in transmission of the pair update rate to the first device and the second device,
    wherein the first device and second device are members of a group created in the information sharing service, the method further comprising:
    computing respective pair update rates for each pair of members within the group; and
    computing a group update rate based on the respective pair update rates.

2. A method of claim 1, wherein computing the group update rate includes averaging the respective pair update rates, determining a weighted average based on a degree of social significance between each pair of members, determining a minimum of the respective pair update rates, or a combination thereof.

3. A method of claim 1, wherein the members of the group operate using respective individual update rates, the method further comprising:
    computing the individual update rate for each of the members of the group based on a respective multiple of the group update rate.

4. A method of claim 1, wherein one or more members of the group are members of one or more other groups associated with either the information sharing service or another information sharing service, the method further comprising:
    computing respective group update rates for the group and each of the one or more other groups; and
    computing an aggregate group update rate based on the respective group update rates.

5. A method of claim 4, wherein computing the aggregate group update rate includes averaging the respective group update rates, determining a weighted average based on a degree of closeness of social relationships within the group and each of the one or more other groups, determining a minimum of the respective group update rates, or a combination thereof.

6. A method of claim 4, further comprising:
    computing an operational group update rate corresponding to the group and each of the one or more other groups based on a respective multiple of the aggregate group update,
    wherein the group and each of the one or more other groups use the corresponding operational group update rate in place of the respective group update rate.

7. A method of claim 6, wherein the respective multiple of the aggregate group update is based, at least in part, on a respective degree of closeness of social relationships within the group and each of the one or more other groups.

8. An apparatus of comprising:
    at least one processor; and
    at least one memory including computer program code,
    the at least one memory and the computer program code configured to, with the at least one processor, cause the apparatus to perform at least the following,
    determine factors related to a level of activity, context, status, or combination thereof between a first device and a second device with respect to an information sharing service,
    compute a pair update rate for sharing information between the first device and second device via the information sharing service based on the determined factors, and
    cause, at least in part, actions that result in transmission of the pair update rate to the first device and the second device,
    wherein the first device and second device are members of a group created in the information sharing service, the apparatus is further caused to:
    compute respective pair update rates for each pair of members within the group; and
    compute a group update rate based on the respective pair update rates.

9. An apparatus of claim 8, wherein computing the group update rate includes averaging the respective pair update rates, determining a weighted average based on a degree of social significance between each pair of members, determining a minimum of the respective pair update rates, or a combination thereof.

10. An apparatus of claim 8, wherein the members of the group operate using respective individual update rates, the method is further caused to:
    compute the individual update rate for each of the members of the group based on a respective multiple of the group update rate.

11. An apparatus of claim 8, wherein one or more members of the group are members of one or more other groups associated with either the information sharing service or another information sharing service, the apparatus is further caused to:
    compute respective group update rates for the group and each of the one or more other groups; and
    compute an aggregate group update rate based on the respective group update rates.

12. An apparatus of claim 11, wherein computing the aggregate group update rate includes averaging the respective group update rates, determining a weighted average based on a degree of closeness of social relationships within the group and each of the one or more other groups, determining a minimum of the respective group update rates, or a combination thereof.

13. An apparatus of claim 11, wherein the apparatus is further caused to:
    compute an operational group update rate corresponding to the group and each of the one or more other groups based on a respective multiple of the aggregate group update,
    wherein the group and each of the one or more other groups use the corresponding operational group update rate in place of the respective group update rate.

14. An apparatus of claim 13, wherein the respective multiple of the aggregate group update is based, at least in part, on a respective degree of closeness of social relationships within the group and each of the one or more other groups.

15. A non-transitory computer readable storage medium carrying one or more sequences of one or more instructions which, when executed by one or more processors, cause an apparatus to at least perform the following steps:

determining factors related to a level of activity, context, status, or combination thereof between a first device and a second device with respect to an information sharing service;

computing a pair update rate for sharing information between the first device and second device via the information sharing service based on the determined factors; and causing, at least in part, actions that result in transmission of the pair update rate to the first device and the second device, wherein the first device and second device are members of a group created in the information sharing service, the apparatus is further caused to perform:

computing respective pair update rates for each pair of members within the group; and computing a group update rate based on the respective pair update rates.

* * * * *